UNITED STATES PATENT OFFICE.

WM. H. POINDEXTER, OF FAYETTE COUNTY, TENNESSEE, ADMINISTRATOR OF JOHN R. REMINGTON.

IMPROVEMENT IN CEMENT COMPOUNDS.

Specification forming part of Letters Patent No. 11,237, dated July 4, 1854.

*To all whom it may concern:*

Be it known that JOHN R. REMINGTON, deceased, late of the county of Macon and State of Alabama, was the inventor of a certain Improved Cement, which he denominated "Remington's Chemico-Mechanical Cement"; and I, WILLIAM H. POINDEXTER, of Fayette County, Tennessee, administrator *de bonis non* of the said deceased, do hereby declare that the following is a full and exact description thereof so far as the same has been made known to me.

The nature of said invention consists in the use of the ashes of cotton-seed or other oil-yielding vegetable substance when mixed with other earthy matters by means of oil or rosin to make a cement having the capability of being molded into almost any shape and assuming the appearance, hardness, and, for most purposes, the durability of stone in a few hours.

To enable others to manufacture and use this invention, I will proceed to describe its composition and construction.

My chief composition is composed of resin (or rosin) and cotton-seed ashes (or other vegetable ashes) and sand; but it is necessary to describe first the furnace and implements used by the inventor himself, and then proceed to the construction of the artificial stone, that the process may be the better understood. He had a low furnace built of brick and mortar, with two large iron kettles set in it (but one kettle is all sufficient) some six or eight inches from the ground, with a flue passing under them and pipes to carry off the smoke. Under the front end he kindled a fire. He placed on the ground planks nailed together like a batten-door, upon which he placed a sheet of Russia iron, and upon that a frame or mold about two and one-fourth feet wide and four feet long and two inches deep. Take care to have the timbers of the mold strong enough not to admit of their springing out when the composition is pressed into it, and the mold for a large flagstone is now ready. The striker is a bar of iron about three-eighths of an inch thick, with an eye on the center of one side to receive a handle, and long enough to reach across the mold. A plasterer's and a brick-layer's trowel and a stick to stir with completes the apparatus. Now throw thirty pounds (or about that quantity) of resin into the kettle, and when melted throw into it a half pint (or a pint, if preferred) of cotton-seed ashes and the same quantity of charcoal-dust or bituminous-coal dust, or a little lamp-black or Spanish brown as coloring-matter, and then stir in dry sand until the mixture will fall short from the stick, when it is ready for the mold. Every iron tool that touches it must be heated. Ladle it out with a common shovel, heated, and pack with the plasterer's trowel until the mold is a little over full. Now strike it hard with the striker and smooth off with the brick-layers's trowel. Let it cool, and it is ready for the pavement. A little practice with a small share of common sense will enable any man to make it.

It is proper to say that the use of the cotton-seed ashes is peculiar, and its place cannot be supplied by wood or other vegetable ashes, as these have been thoroughly tried without any good result. The product becomes brittle and unfit for durable service, while a cement made from cotton-seed ashes is permanent.

What is claimed as JOHN R. REMINGTON'S invention is—

The use of cotton-seed ashes or the ashes of any other oil-yielding vegetable substance, as an ingredient of a cement, substantially as herein set forth, whether it be mixed with rosin and earthy matters or with oil and earthy matter.

WM. H. POINDEXTER,
*Administrator de bonis non of J. R. Remington, deceased.*

Witnesses:
   J. ROOME,
   B. H. GRIDER,
   J. A. BOYD.